United States Patent [19]
Harvey

[11] Patent Number: 5,861,560
[45] Date of Patent: Jan. 19, 1999

[54] SHUTDOWN COOLING PUMP VORTEX DETECTION SYSTEM

[75] Inventor: Robert P. Harvey, Enfield, Conn.

[73] Assignee: Combustion Engineering, Inc., Windsor, Conn.

[21] Appl. No.: 927,137

[22] Filed: Sep. 2, 1997

[51] Int. Cl.[6] .................................................... G01F 1/58
[52] U.S. Cl. ........................................................ 73/861.18
[58] Field of Search ........................... 73/861.19, 861.21, 73/861.22, 861.18; 137/395; 376/246

[56] References Cited

U.S. PATENT DOCUMENTS

| | | | |
|---|---|---|---|
| 4,088,987 | 5/1978 | Resler et al. .............................. | 340/242 |
| 4,405,559 | 9/1983 | Tokarz ..................................... | 376/247 |
| 4,600,554 | 7/1986 | Brachet et al. .......................... | 376/307 |
| 4,879,087 | 11/1989 | Akiyama et al. ........................ | 376/216 |
| 5,235,524 | 8/1993 | Barkhoudarian . | |

FOREIGN PATENT DOCUMENTS

| | | |
|---|---|---|
| 62-204194 | of 0000 | Japan . |
| 61-244897 | 10/1986 | Japan . |
| 62-048993 | 3/1987 | Japan . |
| 01219696 | 9/1989 | Japan . |
| 04291129 | 10/1992 | Japan . |
| 947473 | of 0000 | U.S.S.R. . |

OTHER PUBLICATIONS

Clamp–On Portable multifunction flowmeters, Controtron, 1010DP and 1010WDP, Sep. 1994.

*Primary Examiner*—Richard Chilcot
*Assistant Examiner*—Jewel V. Thompson
*Attorney, Agent, or Firm*—John H. Mulholland

[57] ABSTRACT

A system and method of detecting air vortexing and coriolis effect vortex-created cavitation in a shutdown cooling system drain pump of a nuclear power plant during midloop operation where the plant includes a horizontal hot leg having a drain pipe connected from the lower region thereof to a drain pump which includes attaching transducers of a portable clamp-on ultrasonic flowmeter to the drain pipe to measure and detect flow-void-created disruptions in the flowmeter ultrasonic signal and providing a remote alarm triggered by the disrupted signal.

5 Claims, 1 Drawing Sheet

SHUTDOWN COOLING PUMP VORTEX DETECTION SYSTEM

FIELD OF THE INVENTION

The present invention is directed to a system and method of detection of air vortexing and coriolis effect vortex-created cavitation in a shutdown cooling system drain pump of a nuclear power plant.

BACKGROUND OF THE INVENTION

In a nuclear plant of the pressurized water reactor (PWR) type, coolant fluid, which is basically boron and water, is continuously transferred through a closed circulation loop between a nuclear reactor and one or more steam generators.

During power production, the pressurized coolant absorbs heat released by the thermonuclear reaction occurring in the reactor. The heated coolant then flows through a main pipe which is appropriately known as the "hot leg" of the circulation loop. The hot leg delivers the hot coolant to a steam generator.

In the steam generator, the coolant fluid circulates through a heat exchanger. The heat exchanger cools the coolant fluid and uses the heat removed from the coolant to produce steam. This steam is eventually used to drive turbines and generate electricity.

After the circulating coolant is cooled by a heat exchanger, a circulation pump removes the coolant from the steam generator via a "suction leg" and returns it to the reactor via a "cold leg" and inlet. The coolant is then reheated in the reactor and the cycle repeats.

This circulation of coolant through one or more loops is critical for the operation of the power plant. Not only does it deliver heat energy to the steam generators where the energy is used to produce steam for driving the turbines, but the circulating coolant also prevents the reactor core in the reactor from over-heating.

Nuclear power plant systems, including the steam generators, require periodic maintenance. In particular, the fluid circulation system must be inspected for potential degradation and nozzle dams must be installed and removed from the steam generators to allow inspection and maintenance to be performed in a dry environment.

In order to install and remove nozzle dams, the coolant fluid must be drained from the steam generator. This requires lowering the fluid level in the main circulation loop and consequently the hot leg or main pipe. During such a maintenance period, which is termed a "shutdown", the coolant continues to be heated by decay heat from the reactor core but it is cooled by an alternate heat exchanger and auxiliary circulatory system know as the "shutdown cooling system".

In order to lower the coolant or water level in the shutdown reactor system to allow maintenance operations on portions of the system above the lowered water level, the water level must be controlled and maintained at a minimum level and flow rate to continuously provide adequate core cooling. This minimum level is about midway within the reactor coolant system main loop piping (the hot leg) and is commonly referred to as "midloop".

During midloop operation, coolant water is circulated through the system to cool the core. Typically, there is a drain line or lines which communicate with the lower region of one or more of the main loop pipes or legs to draw the heated water from the core for cooling by the alternate heat exchanger in the shutdown cooling system and subsequent recirculation of cooled water to a reactor inlet and thus to the core.

It is possible to experience the formation of a coriolis effect vortex in the drain line during midloop operation if the water level is lowered too far down or if the drain flow rate is too high. Such a vortex is undesirable because it limits the rate at which coolant flow can be drained from the system and it can eventually lead to cavitation in the drain pump. Both results cause concern for continued cooling of the core.

The current methods to avoid vortex formation attempt to keep the water level as high as possible and/or reduce the flow rate, resulting in a conflict between the need to lower the water level for maintenance service, and the need to keep the water level high and at a sufficient rate for safe core cooling.

Midloop measuring systems in use are related to a detection of the water elevation and inference of the status of the vortex therefrom. Co-pending U.S. patent application Ser. No. 08/783,978, assigned to the same assignee as the instant application and filed Jan. 15, 1997, is for a system which reduces pump cavitation by inserting a vortex breaker in the drain pipe adjacent the main pipe or hot leg.

In nuclear power plants much attention has been given to shutdown cooling system reliability, especially during reactor coolant system midloop water level operation. Midloop operation in a typical pressurized water reactor (PWR) nuclear steam supply system, for example, for the installation and removal of steam generator nozzle dams, can be a very difficult operational process. In fact, typically, the water level allowed tolerance is approximately plus or minus one inch (±1"). The plant operator must control this water level manually. Current instruments used measure only the average reactor coolant system (RCS) water level and the shutdown cooling pump current.

The RCS water level measurement accuracy is limited by the instrument technology used and process parameter changes such as temperature, pressure and boric acid concentration. The shutdown cooling pump current measurement alarm occurs only after air has already been ingested into the pump, thus it cannot be used to avoid the air vortex.

SUMMARY OF THE INVENTION

The invention is for a shutdown cooling system of a nuclear power plant in which a main pipe or hot leg lower region is provided with a drain and a pump for circulation of a portion of the hot leg flow through an auxiliary heat exchanger and back to an inlet of the reactor. Provision for by-passing the heat exchanger for draining water to create an appropriate midloop water level is also provided (not shown). In any event, the drain pump both drains the loop of water to the desired level for maintenance in the steam generator and recirculates coolant to the reactor core as part of the shutdown coolant system. Accordingly, its efficient performance is mandatory.

Pump cavitation caused by a coriolis effect vortex in the hot leg drain pipe robs efficiency by lowering the flow rate of the drain pipe and slowing down the process of achieving the desired level. Also, pump cavitation threatens the pump's ability to adequately recirculate coolant in the shutdown coolant system. Accordingly, efficient performance of the pump is mandatory.

The present invention is unique in that it provides direct detection of air being entrained by a vortex in the shutdown cooling system piping which could lead to a total loss of shutdown cooling. It is an additional plant instrument system used to alert the nuclear power plant operator of a dangerously low reactor coolant system water level condition so that corrective action can be taken in a timely manner.

The novel system and method utilizes for the detection of air vortexing existing commercially available portable clamp-on ultrasonic flowmeters. These instruments are mounted for the detection of air vortexing and provide both local and remote alarms to operating personnel. An air vortex is detected by measurement of a flow void which creates a disruption of the flowmeter ultrasonic signal. An alarm is triggered by each disruption.

The accuracy of currently used water level measurements depends on process parameter changes in temperature, pressure and boric acid concentration. Thus, in present systems, the shutdown cooling pump current measurement for alarm purposes occurs only after air has already been ingested into the pump. Accordingly, it cannot be used to avoid an air vortex. By use of the system of the invention with the existing water level and pump current measurements, the plant operators have an overall improved vortex avoidance system which can avoid a potentially dangerous plant situation and any subsequent extensive regulatory scrutiny and paper work.

DETAILED DESCRIPTION OF THE PREFERRED EMBODIMENT

Figure 1:
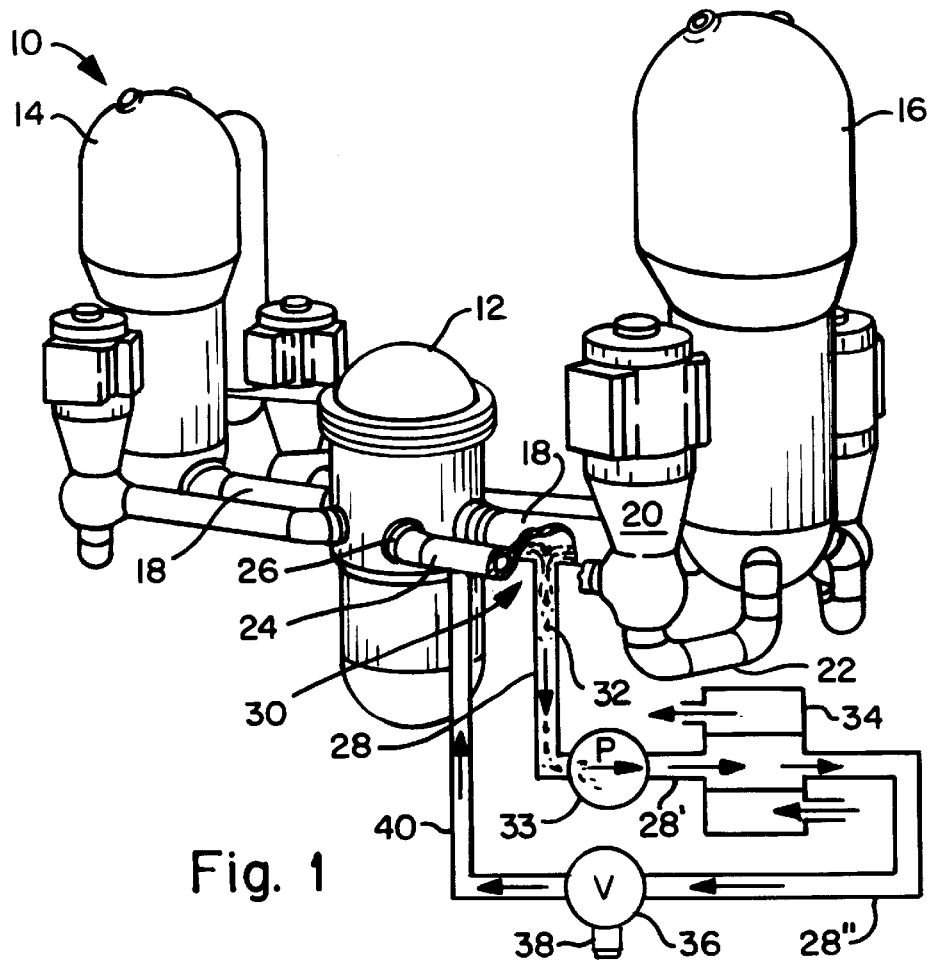
FIG. 1 is an isometric schematic drawing of a nuclear power plant having two steam generators with a shutdown cooling system and drain illustrated in connection with only one of the steam generators, for clarity.

FIG. 1 illustrates a nuclear power plant incorporating the present invention. The numeral 10 generally designates a pressurized water reactor type of plant in which water is continuously transferred through a closed circulation loop between a reactor 12 and each of two steam generators 14 and 16, respectively.

The water coolant from reactor 12 flows through main pipes or hot legs 18 to the respective steam generators 14 and 16, each of which has similar piping.

In the case of steam generator 16, for illustration, a coolant system circulation pump 20 circulates water, which has been cooled in the steam generator, through a suction leg pipe 22, and back to the reactor 12 via cold leg 24 and inlet 26.

The shutdown cooling system drain pipe 28 intersects the lower region of the substantially horizontal main pipe or hot leg 18. Within the lower region of the main pipe 18 is a vortex 30.

Flow from the main pipe 18 into the drain pipe 28 forms the vortex 30 which creates cavitation in drain pump 33 which has direct fluid communication from main pipe 18 where it intersects with the lower region of main pipe 18. This vortex 30 inhibits flow rate in the drain pipe 28 and drain pump 33 by creating voids and cavitation 32. The drain pump 33 discharges through conduit 28' to auxiliary heat exchanger 34 downstream from it for performance of the shutdown cooling system water cooling function.

From heat exchanger 34 the water is directed by valve 36 in drain pipe section 28" to a drain 38 or to a section of pipe 40 which is connected to the main pipe cold leg 24 for recirculation through reactor 12 inlet 26 to cool the core during the shutdown period or in an emergency when the auxiliary heat exchanger's capacity is needed for safety reasons.

Figure 2:
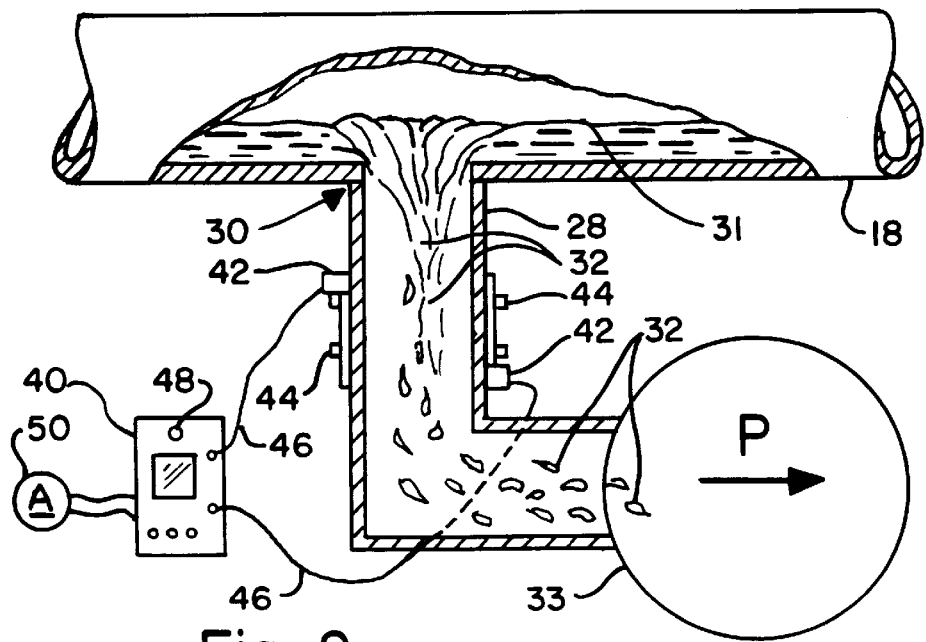
FIG. 2 is an enlarged, fragmented schematic portion of the hot leg and drain pipe of FIG. 1 after the system of air vortexing and coriolis effect vortex-created cavitation detection and alarm of the invention has been attached and put in use.

In FIG. 2, the enlarged vortex 30 is illustrated at the junction of main pipe 18 and drain pipe 22. A typical level of coolant in main pipe 18 for midloop operation is designated by the numeral 31. Entrained air from vortex 30 creates voids and cavitation 32 in drain pipe 28 and pump 33.

A portable clamp or ultrasonic flowmeter 40 has its sensors, which are transducers 42, attached by straps or chains 44 to the drain pipe 28. Transducer cables 46 lead to the flowmeter 40 which has a local alarm 48 mounted therein and a remote alarm 50 which may be placed in the control room to assist in adjusting and controlling the midloop operation coolant flow level 31.

The preferred clamp-on portable flowmeter is a Controlotron System 1010 DP which is available from Controlotron, 155 Plant Avenue, Hauppauge, N.Y. 11788. It is specified in brochure 1010DP-1, a copy of which is attached hereto and is considered part of the disclosure hereof.

I claim:

1. A system of detection of air vortexing and coriolis effect vortex-created cavitation in a shutdown cooling system drain pump of a nuclear power plant during midloop operation comprising:

a main pipe to conduct coolant from a nuclear reactor to a steam generator, said main pipe being substantially horizontal and having an upper region and a lower region;

a drain pipe connected at the lower region of the main pipe to conduct coolant from the lower region to a drain pump;

a portable clamp-on ultrasonic flowmeter with its sensors attached to the drain pipe between the main pipe and the drain pump for the measurement and detection of a flow-void-created-disruption in the flowmeter signal; and, an alarm which is triggered by said disrupted signal.

2. The system of claim 1 in which the alarm is remote from the flowmeter to permit accurate midloop operation by coolant level maintenance within the main pipe.

3. The system of claim 1 in which the portable clamp-on ultrasonic flowmeter is a commercially available product.

4. A method of detecting air vortexing and coriolis effect vortex-created cavitation in a shutdown cooling system drain pump of a nuclear power plant during midloop operation, said plant including a main pipe to conduct coolant from a nuclear reactor to a steam generator, said main pipe being substantially horizontal and having an upper region and a lower region with a drain pipe connected at the lower region of the main pipe to conduct coolant from the lower region to a drain pump, which comprises the steps of:

attaching the sensors of a portable clamp-on ultrasonic flowmeter to the drain pipe between the main pipe and the drain pump;

measuring and detecting flow-void-created-disruptions in the flowmeter ultrasonic signal; and, providing an alarm triggered by such disrupted signal.

5. The method of claim 4 which includes the step of adjusting the midloop operation coolant flow level in the main pipe in response to the alarm.

\* \* \* \* \*